Dec. 4, 1928.　　　　E. G. JOHANSSON　　　　1,693,952
SAFETY SWITCH
Filed May 14, 1926　　　2 Sheets-Sheet 2
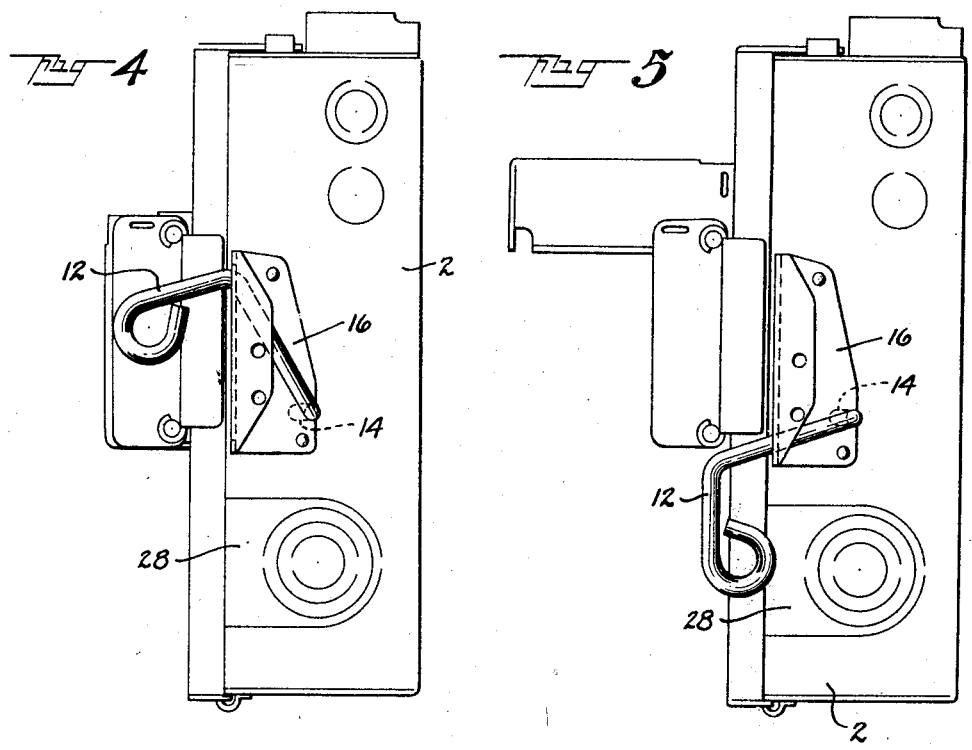
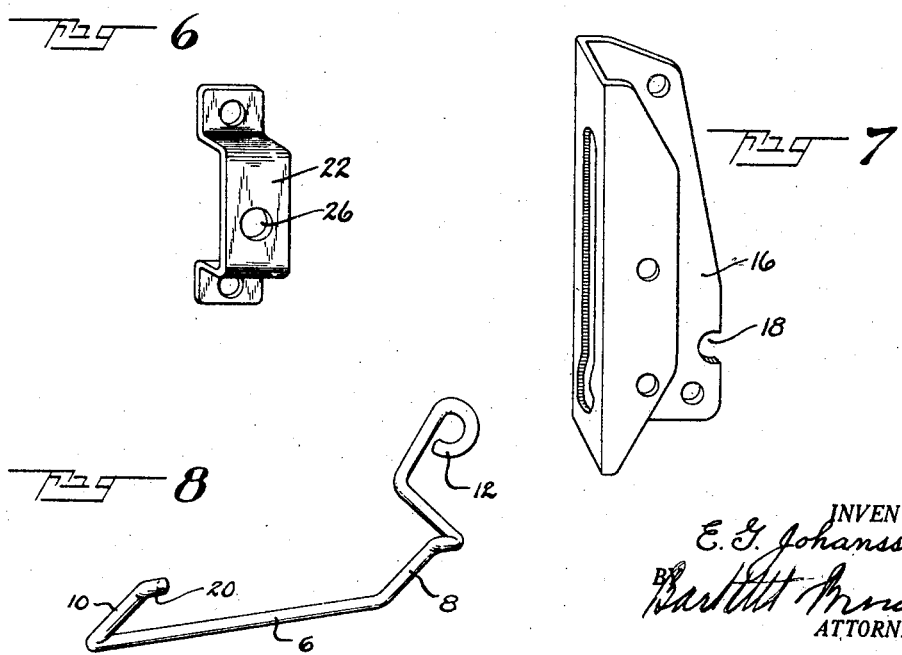
INVENTOR.
E. G. Johansson
BY
ATTORNEYS.

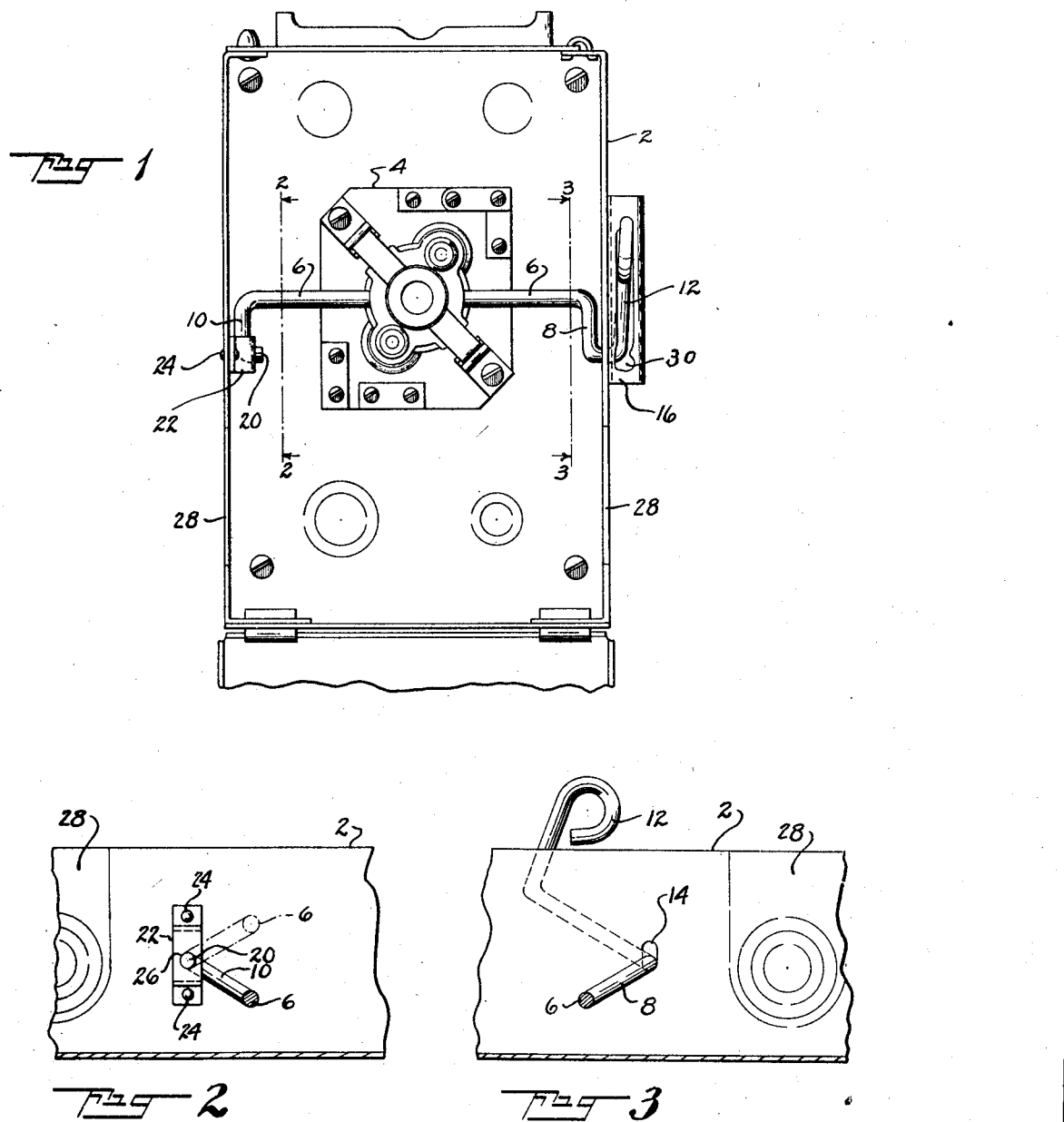

Patented Dec. 4, 1928.

1,693,952

UNITED STATES PATENT OFFICE.

ERNEST G. JOHANSSON, OF BOSTON, MASSACHUSETTS, ASSIGNOR, BY MESNE ASSIGNMENTS, TO THE PALMER ELECTRIC & MANUFACTURING CO., OF WALTHAM, MASSACHUSETTS, A CORPORATION OF MASSACHUSETTS.

SAFETY SWITCH.

Application filed May 14, 1926. Serial No. 109,030.

My invention relates to improvements in safety switches having unitary bail and handle switch actuating cranks and more particularly to the form of the crank and the manner of mounting the same in the casing. Heretofore such cranks have had trunnions projecting from the bail in opposite directions and have been mounted so as to extend through apertures in both of two opposing side walls, being provided with oppositely extending bearing portions and, at one end, with an integral lever handle. This manner of mounting the crank handle is open to various objections, one of which is that the walls being flexible and the crank being yielding either the wall or the crank is liable to be so bent that the far end of the crank, namely the end opposite the handle, slips from the wall opening forming its bearing. When this happens the switch can no longer be properly operated and it is necessary for the service company to send an agent to make repairs. Attempts have been made to obviate this difficulty by making the trunnion upon the end of the crank remote from the handle longer so that it would be less liable to slip out of its socket but this expedient has not been satisfactory. In such case, the end has to project considerably beyond the outer surface of the casing and has been a source of trouble, being liable to catch on various objects and to tear the carton in which the switch is packed.

The object of my invention is to do away with these difficulties and, in addition, to produce a handle which will brace the walls of the box against either inward or outward movement, thus overcoming a standard manufacturing difficulty found in every manufacturer's product where the walls are embraced and the far end of the handle projects through a hole in the side wall.

The following is a description of an embodiment of my invention, reference being had to the accompanying drawings in which:

Figure 1 shows the front view of a safety switch embodying my invention with the cover open;

Fig. 2 is a detail view on the line 2—2 of Fig. 1;

Fig. 3 is a detail view on the line 3—3 of Fig. 1;

Fig. 4 is a side elevation of the switch with the main and auxiliary covers closed;

Fig. 5 is a similar view with the auxiliary cover open;

Fig. 6 is a detail perspective view of the internal bracket;

Fig. 7 is a detail perspective view of the combined bearing plate and stop; and

Fig. 8 is a perspective view of the crank.

Referring more particularly to the drawings, 2 is the casing of the switch. Mounted therein is a switch mechanism 4 of any suitable construction, having an actuating crank composed of a bail 6, having side arms 8 and 10 adjacent to the inner surfaces of the two opposing walls of the switch, and an integral lever handle 12. The portion of the crank between the side arm 8 and the lever handle 12 constitutes a trunnion or bearing portion supported within an aperture 14 in the side walls. This aperture 14 is slightly elongated and is partially closed by a bearing plate 16 having a notch 18 partially embracing the bearing portion of the crank and holding it fixed within and against one end of the slot 14. The lower end of the side arm 10 is turned inward toward the handle 12, as shown at 20, and is supported by a bracket 22 secured to the adjacent side wall by rivets 24, and having a portion spaced away from that side wall in which portion there is a perforation 26. The side arm 10 passes between this spaced away portion and the adjacent side wall and the inwardly turned end 20 passes through the perforation 26, the same being in alinement with the bearing portion at the other end of the crank. The end of the crank remote from the handle 12 is thus provided with a bearing inside of the casing, as distinguished from a bearing in the wall of the casing, so that the far end is not exposed, and this bearing is such that when the handle is once installed there is no danger that it will slip out of place. This is due to the fact that the inner surface of the wall and the opposing surface of the arm 10 abut so as to hold the end 20 within the aperture 26. The crank is, therefore, securely mounted and furthermore does not have an externally protruding end with the accompanying disadvantages.

Not only is the crank secure from being dislodged by the bending of the side walls of the casing, but it acts as a brace to limit both the outward bending and the inward bending of said walls, a feature of importance, particularly where boxes are provided with U-shaped knock-outs, indicated at 28.

In assembling the parts, the crank beginning with end 20 is passed through the aperture 14 until it reaches the position shown in Fig. 1, whereupon the bracket 22 is applied to the end 20 and riveted in place, as shown. The bearing plate 16 is then applied and riveted in place on the outside of the right hand wall so as to hold the right hand bearing portion of the crank fixed within the slot 14.

The member 16 has a slot 30 which limits the movement of the crank in either direction.

As will be evident to those skilled in the art, my invention permits of various modifications without departing from the spirit thereof or the scope of the appended claims.

What I claim is:

1. In a safety switch, the combination of a casing having two opposing side walls, one of said side walls having an aperture, a bracket secured to the inside of the other wall and having a perforated portion spaced away therefrom, a crank having a bearing portion in said aperture and an inwardly turned end in line with the axis of said bearing portion and passing through the perforation in said bracket the wall adjacent to said bracket engaging a portion of said crank and holding said turned end within the perforation of said bracket.

2. In a safety switch, the combination of a casing having two opposing side walls, one of said side walls having an elongated aperture, a bracket secured to the inside of the other wall and having a perforated portion spaced away therefrom, a crank having a bearing portion in said aperture and an inwardly turned end in line with the axis of said bearing portion and passing through the perforation in said bracket the wall adjacent to said bracket engaging a portion of said crank and holding said turned end within the perforation of said bracket, and a member secured adjacent to said aperture holding said bearing portion fixed therein against radial movement.

3. In a safety switch, the combination of a casing having two opposing side walls, one of said side walls having an aperture, a bracket secured to the inside of the other wall and having a perforated portion spaced away therefrom, a crank having a bearing portion in said aperture and an inwardly turned end in line with the axis of said bearing portion and passing through the perforation in said bracket, said crank having a bail portion whose sides are adjacent to the inner sides of said walls so that the wall adjacent to said bracket engages a portion of said crank and holds said turned end within the perforation of said bracket.

In testimony whereof, I have signed my name to this specification this 12th day of May, 1926.

ERNEST G. JOHANSSON.